United States Patent
Scholand et al.

(10) Patent No.: US 9,077,490 B2
(45) Date of Patent: Jul. 7, 2015

(54) METHOD AND DEVICE FOR TRANSMITTING A CHANNEL QUALITY INFORMATION

(75) Inventors: Tobias Scholand, Muelheim (DE); Juergen Kreuchauf, San Francisco, CA (US); Bernd Schiele, Dusseldorf (DE); Tilman Giese, Munich (DE); Alberto Gabriel Perez, San Jose, CA (US); Hyung-Nam Choi, Hamburg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 168 days.

(21) Appl. No.: 13/213,283

(22) Filed: Aug. 19, 2011

(65) Prior Publication Data
US 2013/0044616 A1 Feb. 21, 2013

(51) Int. Cl.
| | |
|---|---|
| H04L 1/00 | (2006.01) |
| H04L 12/26 | (2006.01) |
| H04W 24/00 | (2009.01) |
| H04W 72/04 | (2009.01) |
| H04W 24/10 | (2009.01) |
| G08C 17/00 | (2006.01) |
| H04W 4/00 | (2009.01) |
| H04W 52/14 | (2009.01) |
| H04W 72/08 | (2009.01) |

(52) U.S. Cl.
CPC .......... *H04L 1/0027* (2013.01); *H04W 24/00* (2013.01); *H04W 72/04* (2013.01); *H04L 1/0026* (2013.01); *H04L 1/0031* (2013.01); *H04W 52/146* (2013.01); *H04W 24/10* (2013.01); *H04W 72/085* (2013.01)

(58) Field of Classification Search
CPC .............................. H04W 72/04; H04W 24/00
USPC ............. 370/252, 311, 332; 455/67.16, 422.1
See application file for complete search history.

(56) References Cited

U.S. PATENT DOCUMENTS

| | | | |
|---|---|---|---|
| 2005/0191965 A1* | 9/2005 | Yu et al. ...................... | 455/67.16 |
| 2008/0101280 A1 | 5/2008 | Gholmieh et al. | |
| 2008/0130584 A1* | 6/2008 | Pani et al. ..................... | 370/332 |
| 2008/0146215 A1* | 6/2008 | Oota .......................... | 455/422.1 |
| 2008/0253336 A1 | 10/2008 | Parkvall et al. | |
| 2008/0267302 A1 | 10/2008 | Cai et al. | |
| 2011/0026419 A1* | 2/2011 | Kim et al. ..................... | 370/252 |
| 2011/0141926 A1 | 6/2011 | Damnjanovic et al. | |
| 2011/0141928 A1 | 6/2011 | Shin et al. | |
| 2011/0141959 A1* | 6/2011 | Damnjanovic et al. ....... | 370/311 |

(Continued)

FOREIGN PATENT DOCUMENTS

JP 2011071923 A 4/2011

OTHER PUBLICATIONS

3 GPP 25.101 Section 6.2. Transmit Power. 3 Pages.

(Continued)

*Primary Examiner* — Helal A Algahaim
*Assistant Examiner* — Mahmoud Ismail
(74) *Attorney, Agent, or Firm* — Eschweiler & Associates, LLC

(57) ABSTRACT

In a method for transmitting a channel quality information on the quality of a communication channel in a radio communications system the system includes a regular cycle for transmitting the channel quality information in an uplink direction from a communication unit to a network, and the method including suppressing in the communication unit the transmitting of the channel quality information based on a predefined condition.

14 Claims, 9 Drawing Sheets

(56) References Cited

U.S. PATENT DOCUMENTS

2011/0158123 A1* 6/2011 Kim et al. .................... 370/252
2012/0182910 A1 7/2012 Nakashima et al.

OTHER PUBLICATIONS

3 GPP 25.214 Section 5.1. Uplink Power Control. 18 Pages.
3 GPP 34.121 Section 5.7A. HS-DPCCH Power Control. 5 Pages.

\* cited by examiner

400

401

SUPPRESSING THE
TRANSMITTING OF
CQI IN DEPENDENCE
ON PRE-DEFINED
CONDITION

701 ADAPTING THE CYCLE IN DEPENDENCE ON PRE-DEFINED CONDITION

Fig. 7

METHOD AND DEVICE FOR TRANSMITTING A CHANNEL QUALITY INFORMATION

FIELD

The present invention generally relates to mobile communications. In particular, the present invention relates to a method and a device for transmitting channel quality information on the quality of a communication channel in a radio communications system.

BACKGROUND

During a communication between components of a radio communications system, transmit (TX) powers of transmission channels may vary. Such variations may result in a degradation of a radio link quality and/or a drop of a connection between components of the radio communications system.

Mobile communications transceivers, components included therein and methods performed by such components constantly have to be improved. In particular, it is desirable to improve the stability of channels used for a data transmission between components of a radio communications system. For these and further reasons there is a need for the present invention.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

FIG. 4 schematically illustrates a method 400 as an exemplary embodiment.

FIG. 7 schematically illustrates a method 700 as an exemplary embodiment.

DETAILED DESCRIPTION

Figure 1:
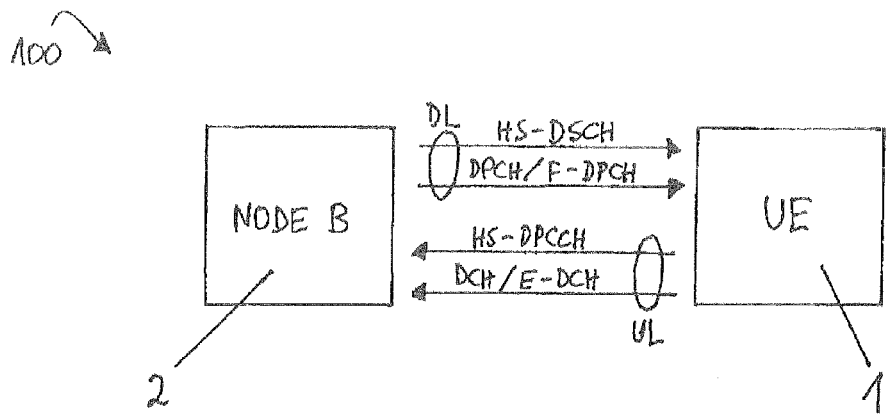
FIG. 1 schematically illustrates a radio communications system 100.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The methods and devices described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" are often used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

In particular, the methods and devices described herein may be based on High Speed Downlink Packet Access (HSDPA) which has been introduced into the Release 5 (Rel-5) version of UMTS standards based on W-CDMA multiple access schemes by the "3rd Generation Partnership Project" (3GPP) standardization. HSDPA represents an enhanced 3G mobile radio communications protocol in the High Speed Packet Access (HSPA) family. HSDPA allows networks based on UMTS to provide higher data transfer speeds and capacity. Current HSDPA deployments may support downlink speeds of 1.8, 3.6, 7.2 and 14.0 Mbit/s. Further speed increases may be available with HSDPA+ which may provide speeds of up to 42 Mbit/s and 84 Mbit/s with Release 9 of the 3GPP standards.

The above mentioned 3GPP standards are described in various documents provided by the 3GPP organization. In particular, the contents of the documents 3GPP TS 25.101; User Equipment (UE) radio transmission and reception (FDD) and 3GPP TS 25.214; Physical layer procedures (FDD) and 3GPP TS 34.121-1; User Equipment (UE) conformance specification; Radio transmission and reception (FDD); Part 1: Conformance specification and 3GPP TS 34.121-2; User Equipment (UE) conformance specification;

Radio transmission and reception (FDD); Part 2: Implementation Conformance Statement (ICS) are included herein by reference.

In radio communications systems, a transmitter transmitting one or more radio communications signals via one or more radio communications channels may be present. The transmitter may be a base station or a transmitting device included in a user's device, such as a mobile radio transceiver, a handheld radio device or any similar device. In particular, a transmitter may include a device as described herein. According to the UMTS standard, a transmitter or base station may also be referred to as "Node B". Radio communications signals transmitted by transmitters may be received by receivers such as a receiving device in a mobile radio transceiver, a handheld radio device or any similar device. In particular, radio communications systems as described herein may include UMTS systems which may conform to the 3GPP standard for UMTS systems. According to the UMTS standard, a receiver or mobile station may also be referred to as "User Equipment" (UE). Radio communications signals as described herein may be provided in UMTS systems, in particular over radio communications physical channels, such as primary common pilot channels, secondary common pilot channels, dedicated physical channels, dedicated physical control channels or similar channels according to the UMTS standard.

FIG. 1 schematically illustrates a radio communications system 100 including a UE 1 and a Node B 2. It is understood that the radio communications system 100 may include further components that are not explicitly illustrated for the sake of simplicity. For example, the radio communications system 100 may further include a Radio Network Controller (RNC) and a Core Network (CN). The RNC may be configured to provide various control functionalities for the Node B 2 while the CN may be configured to provide various services to the UE 1.

A communication between the UE 1 and the Node B 2 is indicated by arrows. In a downlink (DL) direction, data may be transmitted from the Node B 2 to the UE 1 via a High Speed Downlink Shared Channel (HS-DSCH), a Dedicated Physical Channel (DPCH) or a Fractional Dedicated Physical Channel (F-DPCH). In an uplink (UL) direction, data may be transmitted from the UE 1 to the Node B 2 via an HS-DPCCH (High Speed Dedicated Physical Control Channel), a Dedicated Channel (DCH) and an Enhanced Dedicated Channel (E-DCH). The DCH may include a Dedicated Physical Control Channel (DPCCH) and (optionally) a Dedicated Physical Data Channel (DPDCH) while the E-DCH may include an Enhanced Dedicated Physical Control Channel (E-DPCCH) and an Enhanced Dedicated Physical Data Channel (E-DPDCH). Note that the mentioned uplink and downlink channels are, inter alia, known from the above-mentioned 3GPP standards. It is understood that data may also be transmitted between the UE 1 and the Node B 2 via further transmission channels.

The radio communications system 100 may be based on HSDPA in which an increase of the maximum transmission rate in a downlink direction may be achieved by introducing "link adaptive" higher order modulation (e.g. Quadrature Phase Shift Keying (QPSK), 16 Quadrature Amplitude Modulation (QAM), etc.) and multi-code transmission in combination with hybrid automatic request (H-ARQ) procedures. H-ARQ relates to an error-control method for transmitting data in which acknowledgment information is used to provide a reliable data transmission. The acknowledgment information includes messages sent by a receiver to a transmitter indicating whether data has been correctly received (ACK) or not (NACK). For example, the acknowledgment information of the H-ARQ protocol may be fed back from the UE 1 to the Node B 2.

In "link adaptation", modulation and coding parameters as well as further signal and protocol parameters are dynamically adapted to conditions of an associated radio link which may depend on path loss, interference effects, etc. In HSDPA, such parameters may be adapted every 2 milliseconds. In particular, link adaptation may be enabled by a continuous measurement of the channel quality at the UE 1 and feeding back a corresponding Channel Quality Indicator (CQI) from the UE 1 to the Node B 2. The CQI may include channel quality information, for example a carrier level received signal strength indicator (RSSI) and/or a bit error rate (BER).

The CQI and acknowledgment information may be transmitted via the HS-DPCCH. Similar to a transmission time interval (TTI) of the HS-DSCH, a TTI of the HS-DPCCH has a length of three time slots, i.e. a length of 2 milliseconds. The first time slot may be used for transmitting the acknowledgment information while the second and third time slot may be used for transmitting the CQI. The CQI feedback cycle, i.e. the cycle time for the transmission of the TTIs including the CQI, may be adjusted by the CN. The acknowledgment information is transmitted for each transport block that has been received by the UE 1 via the HS-DPCCH. If no CQI or acknowledgment information needs to be transmitted for a particular TTI, the HS-DPCCH may be muted and thus may be inactive during corresponding time slots. Note that while all channels in the DCH and E-DCH are time slot aligned, the HS-DPCCH is aligned to the HS-DSCH timing which results in a timing offset compared to the DCH and the E-DCH.

During a communication between the UE 1 and the Node B 2, TX powers of uplink channels may be adjusted. In order to change the TX power of the DPCCH (and thus the total TX power), a TX power control (TPC) information may be transmitted from the Node B 2 to the UE 1 via the DPCH or the F-DPCH. Such a power control scheme may be referred to as "inner loop power control" (ILPC). The TPC information may include or consist of one single bit per time slot wherein a bit value of "1" (TPC=up) may correspond to a request to increase the TX power of the DPCCH while a bit value of "0" (TPC=down) may correspond to a request to decrease of the TX power of the DPCCH.

The total TX power of the UE 1 in the uplink direction may correspond to a sum of the TX powers of all used uplink physical channels, for example the HS-DPCCH, DCH and E-DCH (see FIG. 1). The TX power configuration of the HS-DPCCH and all uplink physical channels included in the DCH and the E-DCH may be derived from settings of the CN. A change of the total TX power may thus be effected by using the above-mentioned TPC information and/or by changing the physical uplink channel configuration. In this connection, it is noted that the power levels of the DCH and E-DCH physical channels can usually only change at the time slot boundaries of an associated DCH time slot while the power level of the HS-DPCCH may change at the time slot boundaries of a DCH time slot and boundaries of an HS-DPCCH time slot.

During a communication between the UE 1 and the Node B 2, the quality of the uplink data transmission may depend on the availability of sufficient total TX power. In certain scenarios, the quality of the uplink data transmission may degrade which may even result in a call drop. For example, an attenuation of the uplink channels increases for the case of the UE 1 being located at the edge of a cell. In order to encounter this degradation of the uplink quality, the total TX power for the uplink needs to be increased. However, according to the 3GPP standard, a maximum TX power for the uplink is defined which cannot be exceeded by the total TX power. Hence, if the total TX power has reached the maximum TX power level, it is not possible for the ILPC to compensate for the varying channel attenuation to maintain a constant uplink quality. For a handset UE 1, the maximum TX power may particularly equal a value of 24 dBm in one embodiment.

In the mentioned scenario, the uplink quality may be further degraded if a data transmission via the HS-DPCCH is performed. Such a data transmission requires energy for involved radio frequency components of the UE 1 and thus a part of the total TX power. The TX power of the DCH and the E-DCH may then be further reduced resulting in a further degradation of the uplink quality. If the total TX power falls below the maximum TX power again, the ILPC may be used to increase the value of the TX power of the DPCCH and thus the total TX power. In the following, the described scenario is further explained in connection with TX powers of uplink channels.

Figure 2:
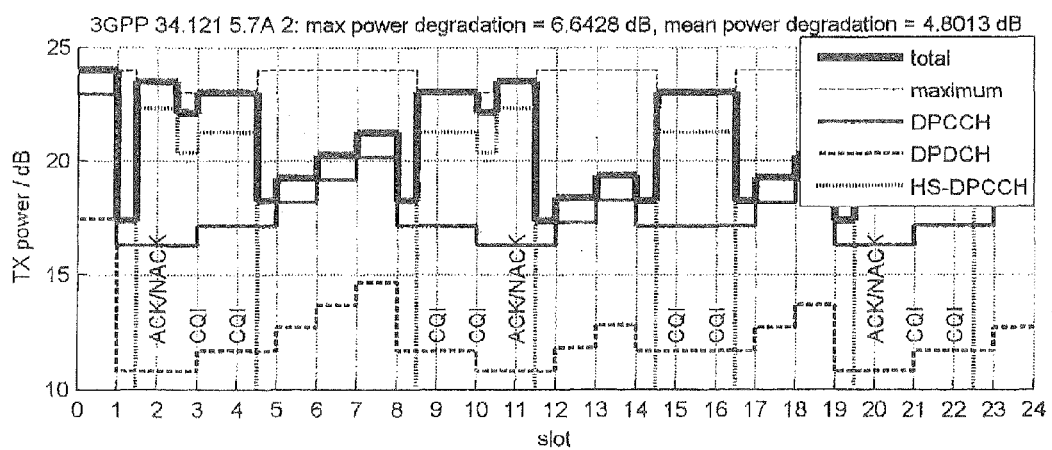
FIG. 2 schematically illustrates TX powers of various uplink channels.

FIG. 2 schematically illustrates TX powers of various uplink channels wherein the TX powers in units of dB are plotted against time in units of time slots. In the following, a point "x" in time may be referred to as "x ts", the abbreviation "ts" denoting "time slot". For example, the end of the first slot may be referred to as "1 ts". Further, a time interval from a point in time "x" to a point in time "y" may be referred to as [x, y]. For example, the second time slot of FIG. 2 may be referred to as [1, 2].

FIG. 2 shows the total TX power, the maximum TX power as well as the TX powers of the DPCCH, DPDCH and HS-DPCCH. The total TX power may be defined in this example to equal the sum of the TX powers of the DPCCH, DPDCH, HS-DPCCH. Note that the scaling of the TX powers is logarithmic due to the used units of dB. Note further that the timing of the HS-DPCCH is shifted by one half of a time slot compared to the timing of the DPCCH and the DPCCH. The CQI feedback cycle, i.e. the cycle time for the transmission of the TTIs including the CQI and the acknowledgment information, equals six time slots or 4 milliseconds. Every third TTI of the HS-DPCCH transmission does not include acknowledgment information. Hence, each of the first TTI [1.5, 4.5] and the second TTI [8.5, 11.5] has an HS-DPCCH activity of three time slots while the third TTI [14.5, 16.5] has two time slots HS-DPCCH activity. As can be seen from FIG. 2, the difference between the TX power of the DP DCH and the TX power of the DPCCH is constant over the whole time interval [0, 24]. In contrast to this, the difference between the TX powers of the HS-DPCCH and the DPCCH changes for the TTIs in which the CQI and acknowledgment information is transmitted.

Referring back to the above-mentioned scenario of the UE 1 being located at an edge of a cell, the UE 1 constantly (i.e. throughout the time interval [0, 24]) receives requests corresponding to or including TPC information requesting an increase of the TX power of the DPCCH in order to compensate for channel attenuation caused by the position of the UE 1. In FIG. 2, the total TX power equals the maximum TX power during the time interval [0, 1] such that it is not possible to further increase the TX power of the DPCCH. A state in which the UE 1 receives a request to increase the TX power of the DPCCH (i.e. TPC=up) and such an increase is not possible may be referred to as "saturated state". It is understood that the terms "saturated state of the total TX power" and "saturated state of the DPCCH power" refer to similar states. For example, a state in which the total TX power has reached the maximum TX power may correspond to a saturated state. In contrast to this, a state in which the UE 1 receives a request to increase the TX power of the DPCCH and such an increase is possible may be referred to as "non-saturated state".

At the time 1.5 ts a transmission of the CQI and acknowledgment information via the HS-DPCCH is started, the transmission requiring a certain amount of the total TX power. Since exceeding the maximum TX power is not possible, the total TX power and the TX power of the DPCCH are decreased at time 1 ts. In FIG. 2, the drop or decrease of the total TX power equals the maximum power degradation and has a value of 6.6428 dB. The mean power degradation, which may be defined as the mean difference of the degraded DPCCH power to the maximum DPCCH power without HS-DPCCH activity, has a value of 4.8013 dB. Note that the illustrated degradation of the DPCCH TX power may also be caused by further incidents, for example a transport format change (TFC) of the DCH and/or E-DCH.

The decrease of the total TX power at the time 1 ts may have an effect on the communication between the UE 1 and the Node B 2, in particular for the case of an "HSDPA call". A "non HSDPA call" corresponds to a circuit switched voice call in which an employed Radio Access Bearer (RAB) is mapped to the DCH for the uplink and the downlink direction. An "HSDPA call" corresponds to a multi radio access bearer call wherein the radio access bearer for the packet switched data call is mapped to the HS-DSCH while the radio access bearer for the circuit switched voice call is mapped to the DCH in the uplink and the downlink direction. The transmission of the CQI via the HS-DPCCH starting at the time 1.5 ts may lead to a degradation of the TX power of other uplink channels, for example the DPCCH, and may thus even result in a drop of the voice call.

In the time interval [1.5, 4.5], the CQI and the acknowledgment information is transmitted over the HS-DPCCH. Note that, for example due to the location of the UE 1 at the cell edge, during the time interval [1.5, 4.5] the UE 1 receives a request to increase the TX power of the DPCCH at every time slot. Except for a time interval [2.5, 3], the total TX power equals the maximum TX power throughout the HS-DPCCH activity. That is, almost throughout the whole time interval [1.5, 4.5], the total TX power and the TX power of the DPCCH are in a saturated state. Except during the time interval time interval [2.5, 3] a non-saturated state is present such that it is possible to increase the TX power of the DPCCH at the time 3 ts.

At the time 4.5 ts, the transmission of the CQI and the acknowledgment information is finished. Since the HS-DPCCH is muted, it does not require further power. At the time 4.5 ts, the total TX power switches from a saturated state to a non-saturated state such that it becomes possible to increase the TX power of the DPCCH and thus the total TX power. In a time interval [4.5, 8], the TX power of the DPCCH and the total TX power is increased for each time slot by a predetermined step size. For example, the "common power control algorithm" of the 3GPP standard may be employed such that the step size may have a value of 1 dBm. Note that, since the step size corresponds to a predetermined constant value, the increase of the total TX power between two time slots is based on the TX power of the DPCCH of the foregoing slot. At the time 8.5 ts a further transmission via the HS-DPPCH is started such that the total TX power is degraded again at the time 8 ts. The characteristics of the illustrated TX powers for times greater than 8.5 ts are similar to the previously described.

Figure 3:
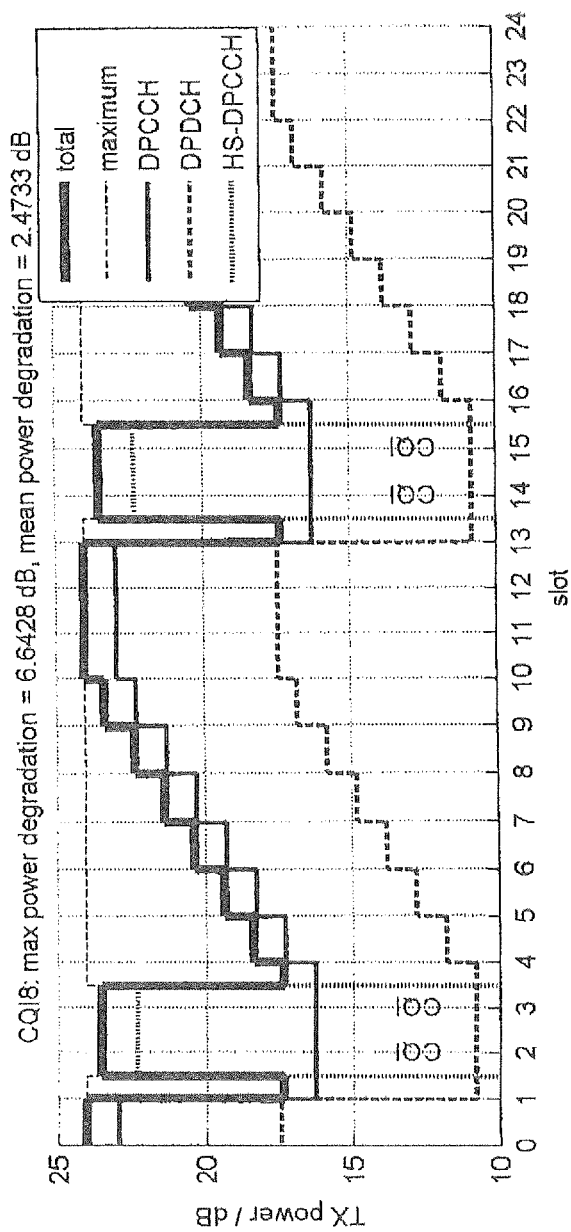
FIG. 3 schematically illustrates TX powers of various uplink channels.

FIG. 3 schematically illustrates TX powers of various uplink channels wherein the TX powers in units of dB are plotted against time in units of time slots. Similar to FIG. 2, the TX powers of FIG. 3 may be read in connection with a UE located at an edge of a cell. Comments made in connection with FIG. 2 may also hold true for FIG. 3. In contrast to FIG. 2, no acknowledgment information is transmitted via the HS-DPCCH. At the time 1 ts, the total TX power is degraded such that a transmission of the CQI starting at the time 1.5 ts becomes possible. Throughout the time interval [1.5, 3.5], the total TX power is in a saturated state such that it is not possible to increase the TX power of the DPCCH.

At the time 3.5 ts, the total TX power changes from a saturated state to a non-saturated state such that it becomes possible to increase the TX power of the DPCCH. Since there is no HS-DPCCH activity during the time interval [3.5, 13.5], the total TX power may be increased to the maximum value of the TX power during the time interval [4, 10]. Note that, since the increase of the total TX power requires various time slots, the link quality may be degraded during the time interval [4, 10] such that the probability of a call drop may be increased. At the time 10 ts, the total TX power switches from a non-saturated state to a saturated state such that it becomes impossible to further increase the TX power of the DPCCH during the time interval [10, 13]. Note that if the saturated state is reached at time 10 ts the ILPC may be broken. Similar to FIG. 2, the total TX power drop and the mean power degradation of FIG. 3 equal a value of 6.6428 dB and 2.4733 dB, respectively.

FIG. 4 schematically illustrates a method 400 for transmitting a channel quality information on the quality of a communication channel in a radio communications system. The system comprises a regular cycle for transmitting the channel quality information in an uplink direction from a communication unit to a network. The method comprises the single method step 401 of suppressing in the communication unit the transmitting of the channel quality information in dependence on (i.e., based on) a pre-defined condition.

The communication unit can be the same or similar to as what was named as user equipment in FIG. 1 and the network can be the same as or similar to as what was named as Node B in FIG. 1.

It is thus an aspect of the embodiment of FIG. 4 that the transmission of the channel quality information is muted in particular single or several consecutive periods of the regular cycle. Such a muting is normally also called discontinuous transmission or DTX so that in the present case the muting of the channel quality information transmission is also called DTX coding in the following.

According to an embodiment of the method of FIG. 4, the pre-defined condition is met if, in case of transmitting the channel quality information, a total transmission power of the communication unit would exceed a maximum allowable transmission power. If therefore the actual total transmission power of the communication unit is in a saturated condition, the pre-defined condition is fulfilled and DTX coding is activated.

According to an embodiment of the method of FIG. 4, the pre-defined condition is met if, for a pre-defined period of the time, in particular a pre-defined number of transmission slots, a situation is given that in case of transmitting the channel quality information a total transmission power of the communication unit would exceed a maximum allowable transmission power. This would mean that the pre-defined condition is met if it is determined that a saturated condition is already present for the pre-defined number of transmission slots.

According to an embodiment of the method of FIG. 4, the pre-defined condition is met if the data traffic on the communication channel or the volume of data transmitted on the communication channel is below a pre-determined level.

According to an embodiment of the method of FIG. 4, the method further comprises transmitting an acknowledgement information, in particular the above-mentioned standardized ACK/NACK information, in an uplink direction, wherein the acknowledgement information acknowledges receipt of data on the communication channel. According to an embodiment thereof, the pre-defined condition is met if, for a pre-defined period of time, in particular a pre-defined number of transmission slots, no acknowledgement information has been transmitted. In this way the transmission of acknowledgement information can be used as an indication whether there is data traffic on the communication channel.

According to an embodiment of the method of FIG. 4, the method further comprises determining in the communication unit whether the pre-defined condition is met. According to an embodiment thereof, the communication unit either itself measures a quantity like its own transmission power or the activity on the communication channel or receives an information from the network about such a quantity and afterwards determines on the basis of the quantity whether the pre-defined condition is met by, for example, comparing the measured or otherwise obtained value of the quantity with a reference value or a threshold value. Further, the determining in the communication unit may further include receiving the pre-defined condition or data associated therewith from external the communication unit, such as from a network, and then evaluating the received information.

According to an embodiment of the method of FIG. 4, the channel quality of the communication channel is measured in the communication unit. According to an embodiment thereof, one of more of a received signal strength and a bit error rate is measured in the communication unit. These quantities can then be converted to a received signal strength indicator (RSSI) and a bit error rate (BER).

According to an embodiment of the method of FIG. 4, the channel quality information comprises a channel quality indicator (CQI) comprising one or more of a received signal strength indicator (RSSI) and a bit error rate (BER).

According to an embodiment of the method of FIG. 4, the communication channel comprises an uplink channel comprising a Dedicated Physical Control Channel (DPCCH).

According to an embodiment of the method of FIG. 4, the method further comprises transmitting the channel quality information via a High Speed Dedicated Physical Control Channel (HS-DPCCH).

Figure 5:
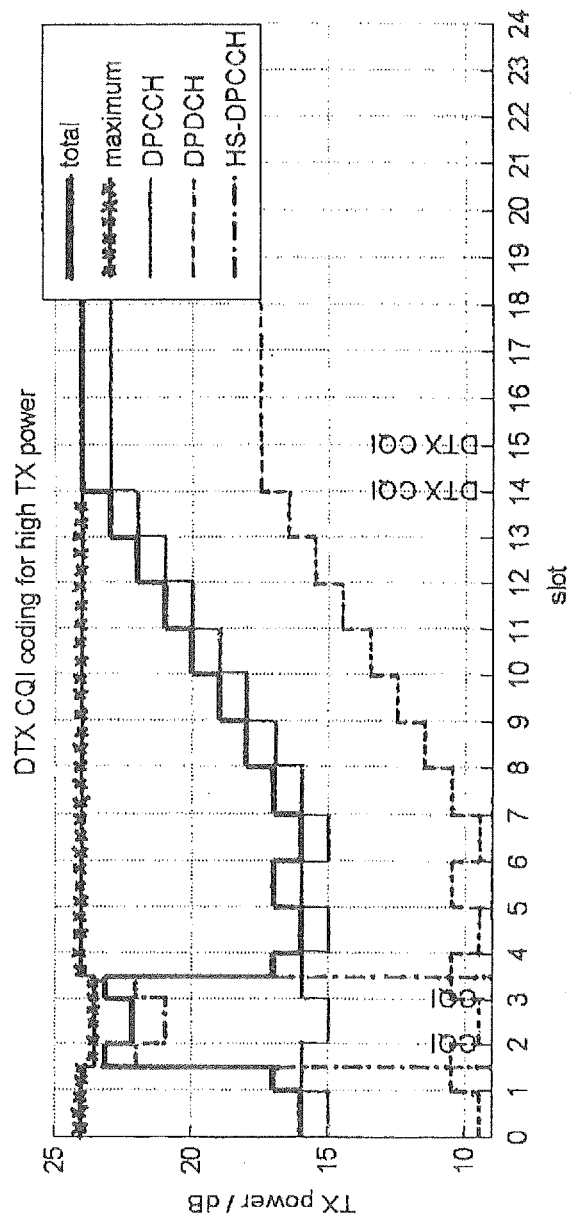
FIG. 5 schematically illustrates TX powers of various uplink channels.

Referring to FIG. 5, there is shown an embodiment by schematically illustrating TX powers of various uplink channels. The embodiment of FIG. 5 is one in which the DTX CQI criterion, i.e. the pre-defined condition, indicates that the case of a CQI transmission would lead to an excess of the total maximum transmission power of the communication unit. This would result in a less TX power and thus in an increased battery lifetime. At slot positions 0 . . . 6 an alternating TPC pattern is assumed and the total TX power level is sufficiently low that the CQI can be transmitted without exceeding the maximum TX power. Starting at slot position 7 a message TPC=up is received from the network resulting in higher total TX power. The CQI transmission at slot positions 14 and 15 would exceed the maximum TX power and is suppressed by using DTX CQI coding.

Figure 6:
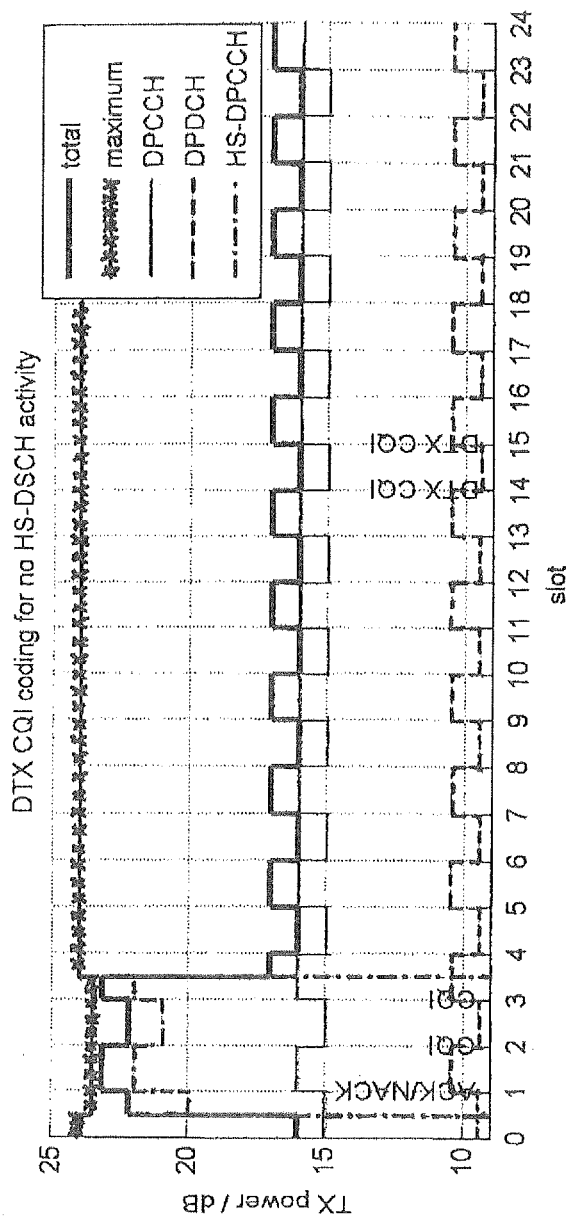
FIG. 6 schematically illustrates TX powers of various uplink channels.

Referring to FIG. 6, there is shown an embodiment by schematically illustrating TX powers of various uplink channels. The embodiment of FIG. 5 is one in which the CQI transmission is muted in case of no HS-DSCCH activity. This would similarly, as in the embodiment of FIG. 5, result in less TX power and thus in an increased battery lifetime. In the embodiment of FIG. 6 the CQI transmission at slot positions 14 and 15 is suppressed since there was no ACK/NAC transmission, i.e. no HS-DSCCH activity, for 12 slots.

According to an embodiment of the method of FIG. 4, if DTX coding is activated on HS-DPCCH instead of regular CQI transmission, the base station or the network would assume lowest channel quality like CQI=0. This might result in a potential degradation of the HSDPA performance. When the HSDPA DL through-put is increased after a period of inactivity, the base station or the network will send first low data rate TTIs assuming CQI=0 until the communication unit starts CQI reporting again. This would result in a short HSDPA through-put latency until the link adaptation is working. However, even in this case the user experience will be enhanced by lower drop call likelihood and longer battery lifetime.

Referring to FIG. 7, there is schematically illustrated a method for transmitting a channel quality information on the quality of a communication channel in a radio communications system according to an embodiment. The radio communications system comprises a regular cycle for transmitting the channel quality information in an uplink direction from a communication unit to a network. The method 700 of FIG. 7 comprises a single step 701 of adapting the cycle in the communication unit in dependence on (i.e., based on) a pre-defined condition.

The regular cycle can at first be pre-scribed by the network and forwarded to the communication unit. Thereafter, the communication unit can autonomously decide on the basis of the pre-defined condition whether it will uphold the regular cycle, increase the regular cycle or decrease the regular cycle.

Further embodiments of the method of FIG. 7, in particular as regards the pre-defined condition, can be formed along the line of the embodiments of the method of FIG. 4.

Figure 8:
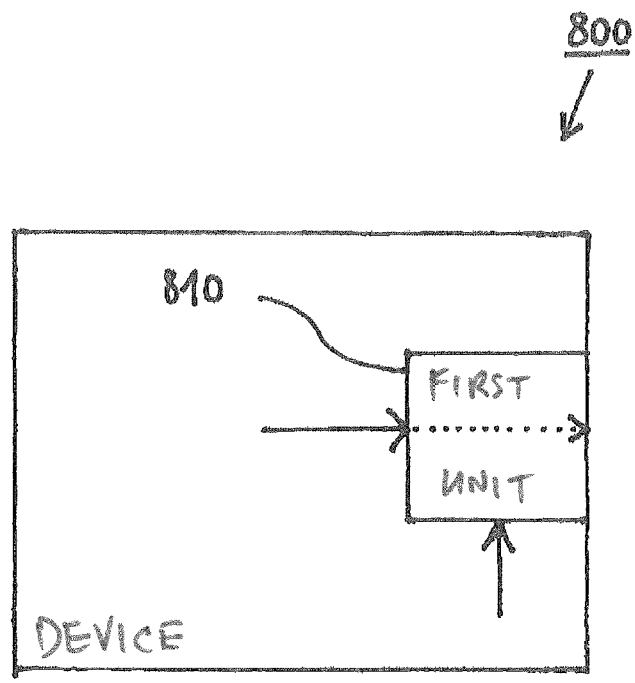
FIG. 8 schematically illustrates a device 800 as an exemplary embodiment.

Referring to FIG. 8, there is shown a schematic block representation of a device for transmitting a channel quality information on the quality of a communication channel in a radio communications system according to an embodiment. The device 800 of FIG. 8 may be read in connection with the previously described method 400 of FIG. 4 in one embodiment, but is not so limited. The system comprises a regular cycle for transmitting the channel quality information in an uplink direction from a communication unit to a network. The device 800 of FIG. 8 comprises a first unit 810 configured to suppress the transmitting of the channel quality information in dependence on a pre-defined condition.

As shown in FIG. 8, the first unit 810 comprises a first input for inputting the channel quality information and a second input for inputting an information whether the pre-defined condition has been met. In case that an information is input at the second input that the pre-defined condition has been met, the channel quality information supplied to the first input would be blocked and not let through to an output of the device.

According to an embodiment of the device 800 of FIG. 8, the device 800 further comprises a second unit (not shown) coupled to the first unit 810 and configured to determine whether the pre-defined condition has been met.

According to an embodiment of the device 800 of FIG. 8, the device 800 is part of a communication unit and can either be implemented in hardware or alternatively in software in the form of a program module of a digital signal processor (DSP) or in the form of firmware.

Further embodiments of the device 800 of FIG. 8 can be formed along the line of the embodiment of FIG. 4.

Figure 9:
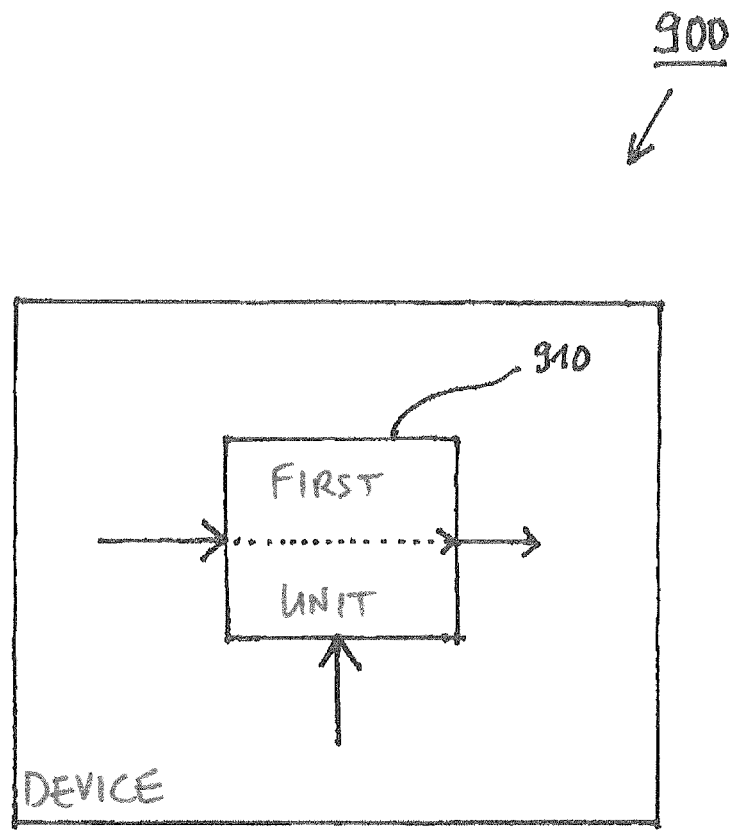
FIG. 9 schematically illustrates a device 900 as an exemplary embodiment.

Referring to FIG. 9, there is shown a device for transmitting a channel quality information on the quality of a communication channel in a radio communications system according to an embodiment. The device 900 of FIG. 9 may be read in connection with the previously described method 700 of FIG. 7 in one embodiment, but is not so limited. The radio communications system comprises a regular cycle for transmitting the channel quality information in an uplink direction from a communication unit to a network. The device 900 comprises a first unit 910 configured to adapt the cycle in dependence on a pre-defined condition.

According to an embodiment of the device 900 of FIG. 9, the device 900 comprises a second unit (not shown) coupled to the first unit 910 and configured to determine whether the pre-defined condition has been met.

As indicated in FIG. 9, the first unit 910 may comprise a first input for inputting the channel quality information and a second input for inputting an information whether the pre-defined condition has been met. If an information is input at the second input that the pre-defined has been met, the cycle is increased. Later on a further information might be input and the second input that the pre-defined condition is no longer present so that the cycle can be adjusted to its regular value. The regular cycle can be given or pre-scribed by the network.

Further embodiments of the device 900 of FIG. 9 can be formed along the line of the embodiments of FIG. 7.

Figure 10:
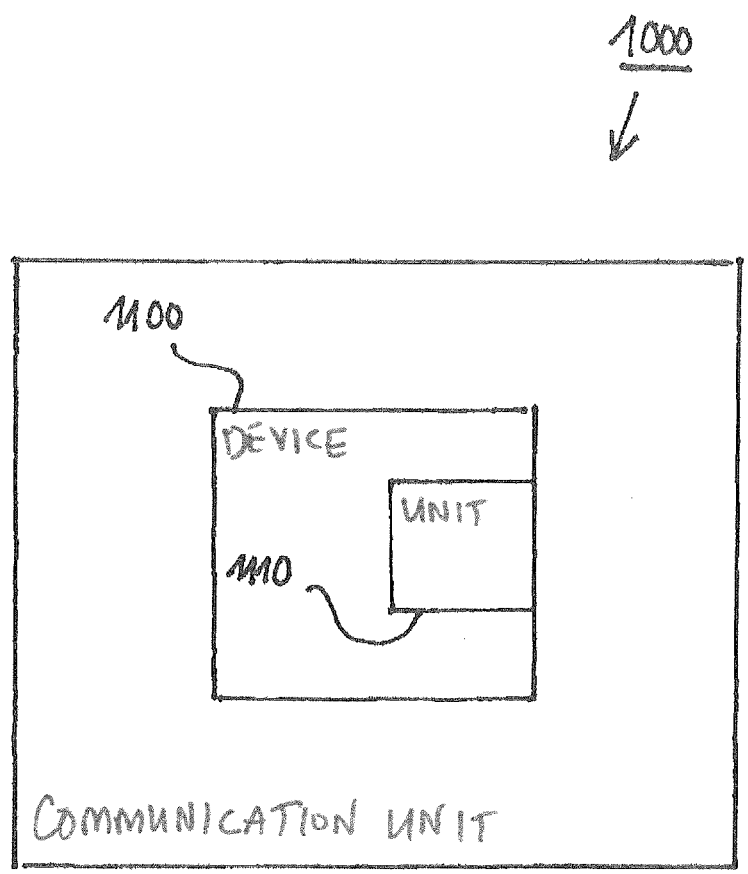
FIG. 10 schematically illustrates a device 1000 as an exemplary embodiment.

Referring to FIG. 10, there is shown a schematic block representation of a communication unit for a radio communications system according to an embodiment. The system comprises a regular cycle for transmitting in an uplink direction from the communication unit to a network a channel quality information on the quality of a communication channel. The communication unit 1000 of FIG. 10 comprises a device 1100 configured to transmit the channel quality information wherein the device 1100 comprises a unit 1110 configured to suppress the transmitting of the channel quality information in dependence on a pre-defined condition.

The device 1100 and the unit 1110 can be formed along the embodiments as described in connection with FIGS. 8 and 9.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method for transmitting a channel quality information on a quality of a communication channel in a radio communications system, wherein the system comprises a regular cycle for transmitting the channel quality information in an uplink direction from a communication unit to a base station, the method comprising:

determining in the communication unit whether a pre-defined condition is met by generating a comparison based on a quantity with a reference value, and, based on the comparison, determining whether a saturated condition is present for a pre-defined number of transmission slots by determining whether a total uplink transmission power to transmit the channel quality information at the pre-defined number of transmission slots would exceed an allowable uplink transmission power; and suppressing in the communication unit the transmitting of the channel quality information based on the pre-defined condition being met.

2. The method according to claim 1, further comprising: measuring a channel quality in the communication unit to obtain the channel quality information.

3. The method according to claim 1, further comprising: measuring one or more of a received signal strength and a bit error rate to obtain the channel quality information.

4. The method according to claim 1, wherein the channel quality information comprises a channel quality indicator (CQI) comprising one or more of a Received Signal Strength Indicator (RSSI) and a Bit Error Rate (BER).

5. The method according to claim 1, wherein the communication channel comprises an uplink channel comprising a Dedicated Physical Control Channel (DPCCH).

6. The method according to claim 1, further comprising: transmitting the channel quality information via a High Speed Dedicated Physical Control Channel (HS-DPCCH) if the pre-defined condition does not dictate a suppression of the transmission of the channel quality information.

7. The method according to claim 1, further comprising: transmitting an acknowledgment information in the uplink direction, wherein the acknowledgement information acknowledges receipt of data on the communication channel.

8. The method according to claim 7, wherein the pre-defined condition is met if, for the pre-defined number of transmission slots, no acknowledgement information has been transmitted.

9. A method for transmitting a channel quality information on a quality of a communication channel in a radio communications system, wherein the system comprises a regular cycle for transmitting the channel quality information in an uplink direction from a communication unit to a base station, the method comprising:
determining in the communication unit whether a pre-defined condition is met by generating a comparison based on a quantity with a reference value, and, based on the comparison, determining whether a total uplink transmission power to transmit the channel quality information at a pre-defined number of transmission slots would exceed an allowable uplink transmission power; and
adapting in the communication unit the regular cycle based on the pre-defined condition being met.

10. The method according to claim 9, further comprising: transmitting an acknowledgment information in the uplink direction, wherein the acknowledgement information acknowledges receipt of data at the communication unit on the communication channel.

11. The method according to claim 10, wherein the pre-defined condition is met if, for the pre-defined number of transmission slots, no acknowledgement information has been transmitted.

12. A device for transmitting a channel quality information on a quality of a communication channel in a radio communications system, wherein the system comprises a regular cycle for transmitting the channel quality information in an uplink direction from a communication unit to a base station, the device comprising:
a processor configured to suppress the transmitting of the channel quality information based on a pre-defined condition
and determine whether the pre-defined condition has been met by generating a comparison based on a quantity with a reference value, and, based on the comparison, determining whether a saturated condition is present for a pre-defined number of transmission slots by determining whether a total uplink transmission power to transmit the channel quality information at the pre-defined number of transmission slots would exceed an allowable uplink transmission power.

13. A device for transmitting a channel quality information on a quality of a communication channel in a radio communications system, wherein the system comprises a regular cycle for transmitting the channel quality information in an uplink direction from a communication unit to a base station, the device comprising:
a processor configured to adapt the regular cycle based on a pre-defined condition
and determine whether the pre-defined condition has been met by generating a comparison based on a quantity with a reference value, and, based on the comparison, determining whether a total uplink transmission power to transmit the channel quality information at a pre-defined number of transmission slots would exceed a maximum allowable uplink transmission power.

14. A communication unit for a radio communications system, wherein the system comprises a regular cycle for transmitting in an uplink direction from the communication unit to a base station a channel quality information on a quality of a communication channel, the communication unit comprising:
a device configured to transmit the channel quality information, the device comprising a processor configured to suppress the transmitting of the channel quality information based on a pre-defined condition being met, and determine whether the pre-defined condition has been met by generating a comparison based on a quantity with a reference value, and, based on the comparison, determining whether a saturated condition is present for a pre-defined number of transmission slots by determining whether a total uplink transmission power to transmit the channel quality information at the pre-defined number of transmission slots would exceed an allowable uplink transmission power.

* * * * *